METHOD AND DEVICE FOR ELECTROSTATICALLY RECORDING SIGNALS

Filed April 15, 1968

INVENTOR.
JAN ROOS
BY
AGENT

United States Patent Office 3,553,717

Patented Jan. 5, 1971

3,553,717

METHOD AND DEVICE FOR ELECTROSTATICALLY RECORDING SIGNALS

Jan Roos, Emmasingel, Eindhoven, Netherlands, assignor, by mesne assignments, to U.S. Philips Corporation, New York, N.Y., a corporation of Delaware Filed Apr. 15, 1968, Ser. No. 721,488

Claims priority, application Netherlands, May 6, 1967, 6706387

Int. Cl. G01d *15/06;* B01k *1/00*

U.S. Cl. 346—74 4 Claims

ABSTRACT OF THE DISCLOSURE

A device for electrostatically recording and erasing signals on a record carrier of insulating material moving in a given direction which uses a conductive layer on one side of the carrier and an insulated stylus on the other side of the carrier. A conductive electrode is inserted into the stylus and protrudes therefrom at a distance $d_1$ from a sharp edge of the stylus. The distance $d_1$ is slightly less than a critical distance within which charge density varies linearly with signal voltage.

The invention relates to a method of electrostatically recording and/or erasing signals on and/or from a record carrier of insulating material which is moved along a comparatively sharp edge of a recording member, whilst on the side of the record carrier remote from the recording member a conducting layer is arranged. The term "signals" is employed to signify any arbitrary charge pattern, whilst the conductive layer on the record carrier may be fixedly arranged for example by vapour deposition or may be a separate ribbon or even a temporally arranged layer for example a counter-electrode.

In a known method, a charge pattern is applied to the record carrier by means of gas discharges between the recording member having the form of an electrode and the surface of the record carrier. The region in which the charge transfer is effected has a width which can be derived from the Paschen curve and which is considerably influenced by dust particles and irregularities in the record carrier, because the gas discharge takes place in the inaccurately defined narrow space between the recording mmeber and the record carrier.

According to the invention, the electrode is arranged at a distance from the sharp edge of insulating material which is slightly smaller than the critical distance in a direction opposite the direction of movement of the record carrier. This has the advantage that the gas discharge is cut off sharply so that the track on the record carrier is more accurately defined and is less strongly frayed.

According to another embodiment of the invention, the recording member is set into an oscillatory movement at a frequency which may be equal to twice the frequency of the high-frequency bias voltage in a direction at right angles to the surface of the record carrier and in a manner such that the sharp edge contacts the record carrier at the maximum amplitude of the bias voltage. This has the advantage that any impurities are removed.

According to still another embodiment the invention is applied for neutralising electrostatic charges on tapes of plastic foil which are unwound from a roll, said tapes being subsequently wound to form an electric capacitor with the interposition of metal strips if necessary. This gives the advantage that the repelling forces between the turns of the capacitor caused by the electrical charges, which counteract a high winding are eliminated and consequently the volume of the wound capacitor diminished.

Figure 1:
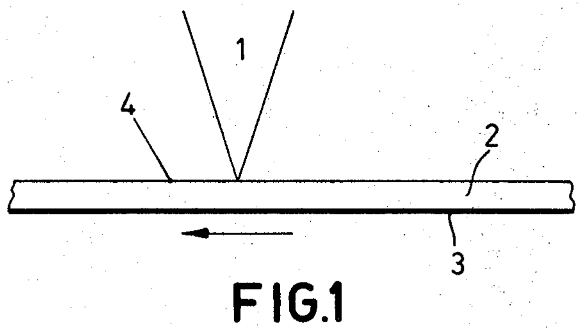
Figure 2:
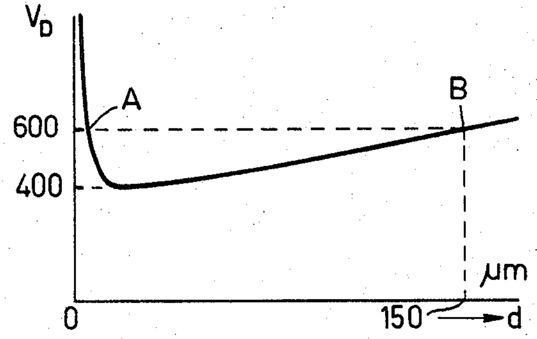
Figure 3:
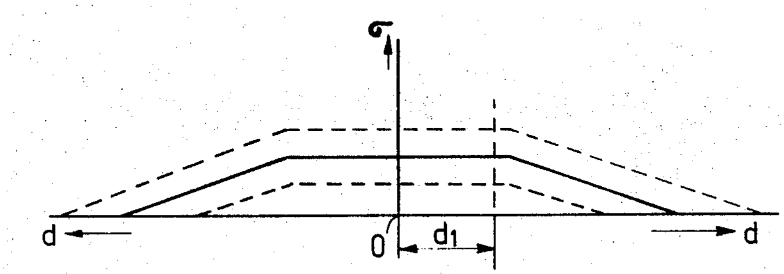
Figure 4:
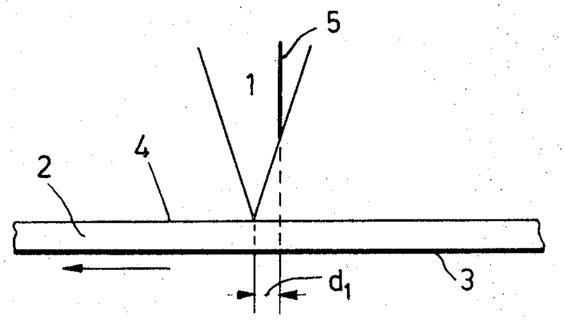

The invention will now be described more fully with reference to the following figures, of which:

FIG. 1 shows the position of the recording member relative to the record carrier, FIG. 2 shows the Paschen curve, FIG. 3 shows a graph of the charge density, FIG. 4 shows a recording member according to the invention.

FIG. 1 shows a conducting recording member 1 along which moves a record carrier 2 of insulating material which is provided with a metal layer 3 on the side remote from the recording member. The gas discharges take place between the recording member 1 and the free surface 4 of the record carrier, which results in the formation of a charge pattern on the insulating material 2. The relation between the writing current $i_s$ and the required voltage $V_s$ is linear on the understanding that a given voltage $V_d$ is necessary to pass the current from the electrode 1 to the record carrier 2. This voltage is at least approximately 400 v. Apart from this threshold voltage $V_d$, the writing current is determined by the relation $i_s = V_s.c.b.s.$, where $c$ represents the capacity of the record carrier per sq. cm., $b$ the length of the sharp edge contacting the record carrier and $s$ the speed of the record carrier 2. The higher the writing speed, the larger is the surface to which the charge is applied and hence the larger is the overall charge. The linear recording of a signal requires a bias voltage of, for example, 600 v. The breakdown voltage of a gas discharge as a function of the distance varies in accordance with the Paschen curve of FIG. 2. Under certain conditions, the minimum value of the breakdown voltage lies at a distance $d$ of 10 to 15 $\mu$m. With a bias voltage of 600 v., the gas discharge takes place in the region lying between A and B, which region corresponds to the maximum distance $d$ of approximately 150 $\mu$m. on either side of the sharp edge. This is indicated diagrammatically in FIG. 3 by a full line. This line indicates the charge density on the record carrier as a function of the distance $d$ from the sharp edge of the recording member 1 at the bias voltage of 600 v. At a given amplitude of the signal to be recorded, the charge pattern varies between the two dotted lines. From this it appears that not only the charge density, but also the distance $d$ from the sharp edge is varied. The latter variation is undesirable because it renders the maximum frequency to be recorded dependent upon the amplitude of the signal to be recorded, as a result of which the frequency range is strongly limited and moreover non-linear effects are produced.

The non-linear effects may be slightly reduced by the application of a high-frequency bias voltage, whilst this bias voltage also promotes the erasing process. The distance $d$ is preferably limited to a critical distance within which the charge density varies linearly with the signal voltage so that the variation in the longitudinal direction of the tape is suppressed. In FIG. 3, this corresponds to the distance $d_1$. This is achieved in that the recording member 1 shown in FIG. 4 is manufactured from a wear-resistant insulating material, whilst the writing electrode 5 is arranged in the insulating material in a direction opposite the direction of movement of the record carrier at a distance $d_1$ from the sharp edge which is slightly smaller than the critical distance (of FIG. 4). When the recording member 1 is set into an oscillatory movement at a frequency which may be equal to twice the frequency of the bias voltage in a direction at right angles to the surface of the record carrier 2 and in a manner such that the sharp edge contacts the record carrier 2 at the maximum amplitude of the bias voltage, any impurities are removed so that the fraying of the recording is even further reduced.

When only a high-frequency bias voltage is applied, charge patterns on surfaces can be neutralized, since in this case the recorded positive and negative charges lie so close to each other that they cancel each other.

This step may be used in the manufacture of foil capacitors, in which the charge on the foil renders its processing very difficult.

What is claimed is:

1. Apparatus for electrostatically recording and erasing signals on a record carrier of insulating material moving in a given direction, comprising a conductive layer on one side of the carrier, a recording member made of insulating material and having a sharp edge juxtaposed the other side of the carrier, and a conductive electrode on the same side of the recording member as the approaching record carrier and positioned at a distance $d_1$ from the sharp edge of the member measured in a direction parallel to the carrier, wherein the distance $d_1$ is slightly less than a critical distance within which charge density varies linearly with signal voltage.

2. Apparatus as claimed in claim 1, wherein the electrode comprises means for conducting a high frequency bias voltage to the carrier, wherein the recording member comprises a stylus oscillating at a frequency substantially equal to twice the frequency of the bias voltage in a direction perpendicular to the carrier, and wherein the stylus oscillates in a fixed phase relationship with the bias voltage and contacts the carrier at the maximum amplitude of the bias voltage.

3. A method of altering the electrostatic charge on a record carrier of insulating material with a conductive layer and a sharp edge of a recording member of insulating material comprising the steps of moving the carrier between the sharp edge of the recording member and the conductive layer, and applying a voltage to a location on the same side of the recording member as the approaching record carrier and at a distance $d_1$ from the sharp edge of the recording member measured in a direction parallel to the carrier, wherein the distance $d_1$ is slightly less than a critical distance within which charge density varies linearly with signal voltage.

4. A method as claimed in claim 3, wherein the carrier comprises a tape of plastic foil which is unwound from a roll, wherein the voltage is a charge neutralizing voltage and wherein the tape is subsequently wound to an electric capacitor.

References Cited

UNITED STATES PATENTS

| | | | |
|---|---|---|---|
| 2,778,708 | 1/1957 | Lamb et al. | 346—74 |
| 3,391,314 | 7/1968 | Carter | 204—168X |

OTHER REFERENCES

Serwatz, H., and Richarson, D. E.: Charge Transfer Processes in Electrostatic Recording, IEEE Transactions on Audio, July–August 1964, pp. 63–66.

BERNARD KONICK, Primary Examiner

G. M. HOFFMAN, Assistant Examiner

U.S. Cl. X.R.

204—165, 312